No. 860,670. PATENTED JULY 23, 1907.
J. W. JOHNSON.
GATE.
APPLICATION FILED JAN. 12, 1907.

2 SHEETS—SHEET 2.

Witnesses
Inventor
John W. Johnson
By
Attorney

# UNITED STATES PATENT OFFICE.

JOHN WEBSTER JOHNSON, OF LEAVENWORTH, KANSAS.

GATE.

No. 860,670. Specification of Letters Patent. Patented July 23, 1907.

Application filed January 12, 1907. Serial No. 351,970.

*To all whom it may concern:*

Be it known that I, JOHN WEBSTER JOHNSON, a citizen of the United States, residing at Leavenworth, in the county of Leavenworth and State of Kansas, have invented new and useful Improvements in Gates, of which the following is a specification.

My invention relates to jump gates and opening and closing devices therefor.

The object of the present invention is the provision of a jump gate supported in a novel manner, whereby it is hung from such points that liability of sagging will be minimized and it will be adapted to travel in a perfectly horizontal line in opening and closing.

Another object is the provision of novel means for latching the gate in closed position, together with improved operating means, whereby the gate may be opened and closed when approached from either direction without the necessity of dismounting from a horse or vehicle.

The invention is set forth fully hereinafter and the novel features are recited in the appended claims.

Figure 1:
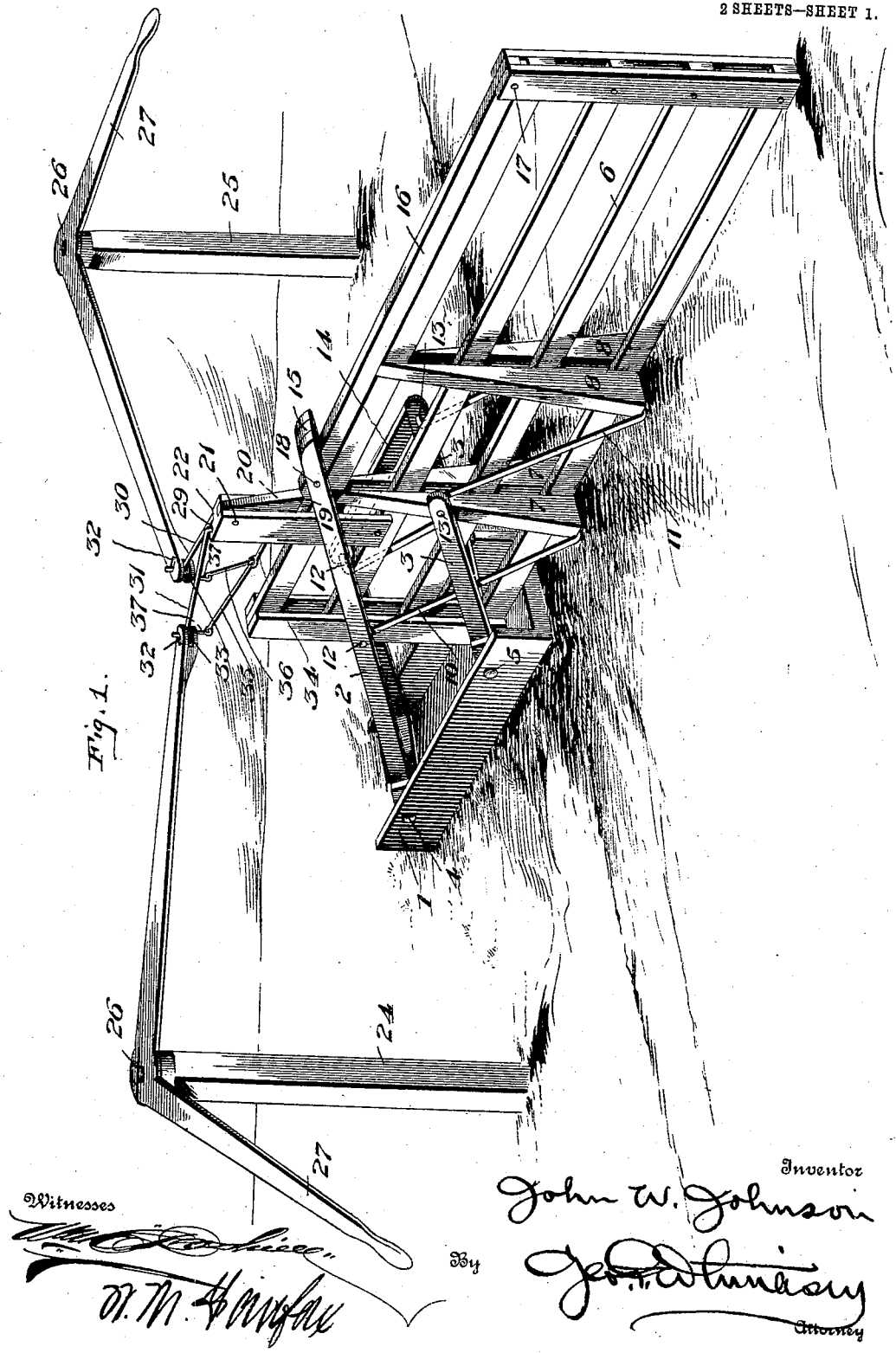
Figure 2:
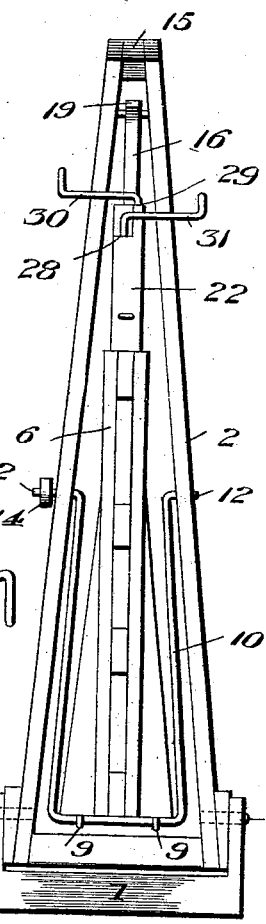
Figure 4:
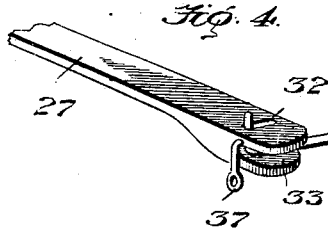
Figure 5:
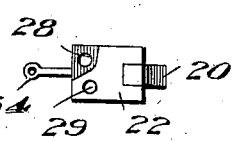
Figure 3:
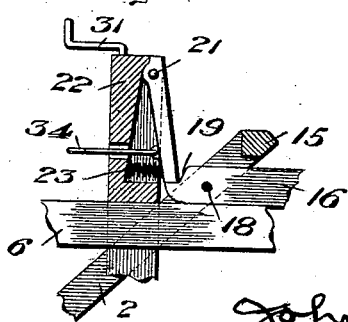

In the accompanying drawings:—Figure 1 is a perspective view of my improved gate shown in closed position; Fig. 2, a detail end view looking toward the inner end of the gate; Fig. 3, an enlarged detail of the latching mechanism; Fig. 4, an enlarged detail of part of the releasing mechanism; and Fig. 5, a detail looking down on the latch.

Positioned and suitably anchored at one side of the road which the gate is intended to guard, is a trough-shaped box 1. The gate is hung or suspended from sets of rockers 2 and 3 which are mounted by pivots 4 and 5 in the sides of the box 1, the lower ends of the rockers of the respective sets being connected by cross-bars, and the gate being adapted to travel above the cross-bars and between the respective rockers All of the rockers converge upwardly The gate 6 is provided with vertical braces 7 and 8, to the lower parts of which are journaled in eyes or staples 9 and in grooves in the braces 7 and 8, the respective U-shaped metal links 10 and 11, the upper ends 12 of the double link 10 being journaled in the rockers 2 and the upper ends 13 of the double link 11 being journaled in the ends of the rockers 3. The rockers 2 are coupled to the rockers 3 by a connecting bar 14 so that said rockers move in unison in the manner of a parallel ruler. The rockers 2 are extended upwardly above the gate and connected together at 15, where the ends are rounded to form a cam. A locking bar 16 is pivoted to the top of the gate at 17, but is otherwise free from the gate, and its opposite end lies between the converging upper ends of the rockers 2 and is pivoted to them on the pin 18. This end of the locking bar 16 is provided with a notch 19, which is adapted to be engaged by a latch 20 pivoted at 21 to a bar 22, which is secured to the gate, the latch being normally pressed outwardly by a coil spring 23 so that it is in position to snap into engagement with the notch 19 when the gate is closed The movement of the rocker 2 when the gate is open or closed, causes the notched end of the locking bar 16 to rise and fall. But so long as this bar is engaged by the latch it cannot rise, and thus the gate cannot be opened by animals or in any manner except by operating the gate-opening mechanism now to be described.

At suitable points on opposite sides of the gate posts 24 and 25 are provided on which are pivotally mounted at 26 bell-crank levers 27, which have their handle portions arranged adjacent to the road so that they may be conveniently grasped by a person on horseback or occupying a vehicle. Pivotally mounted in sockets 28 and 29 in the upper end of the bar 22 are pitmen or cranks 30 and 31 whose opposite ends are turned upwardly and are received in the slots 32 in the ends of the levers 27, the ends of the levers being recessed at 33 for the support of the pitmen 30 and 31. A link 34, which is connected to the latch 20, is, in turn, connected by pull rods or cords 35 and 36 to hangers 37 on the ends of the bell-crank levers.

When the gate is closed the locking bar lies along its top and, the latch 20, by its engagement with the notch 19, prevents the gate from being opened except upon retraction of the latch, which can be accomplished by the hand of a person walking, or by operation of the bell-crank levers from horseback or a vehicle. Once the latch is retracted, the gate can be opened by hand or by operation of the levers, but inasmuch as it is necessary to retract the latch before retracting the gate, the slots 32 are provided, which permit the levers to move a slight distance to retract the latch before the levers positively engage the up-turned ends of the pitmen 30 and 31.

When the gate is completely open the locking bar once more lies along its top, but, the cam end 15 strikes against the latch and prevents reëngagement of the latch and notch 19 so that after the gate has been passed, it may be readily closed by operating the other lever. The bar 16, in addition to its function as a lock, also serves to support the outer end of the gate and prevent it from sagging.

Having thus described my invention, what I claim as new and desire to secure by Letters Patent, is:—

1. In a jump gate, the combination with parallel rockers, of a connecting bar connecting said rockers together, a gate, and parallel U-shaped rod-links having their ends pivotally connected to the respective rockers and their cross-pieces journaled to the gate.

2. In a jump gate, the combination with a gate, of rockers extending up above the gate, links connecting the rockers to the gate, and a supporting bar pivoted to the upper ends of the rockers and pivoted to the top of the gate.

3. In a jump gate, the combination with a gate, of rockers, links supporting the gate from the rockers, and a latch carried by the gate for locking the rockers.

4. In a jump gate, the combination with a gate, of rockers, links supporting the gate from the rockers, a latch carried by the gate for locking the rockers, and gate-opening and closing devices having a loose connection with the gate and having means for retracting the latch.

5. In a jump gate, the combination with a gate, of rockers, links suspending the gate from the rockers, a locking bar pivoted to upward extensions of the rockers and also pivoted to the gate, a latch carried by the gate and adapted to engage the said locking bar to lock the gate in closed position, and means for preventing engagement of the latch and locking bar when the gate is open.

6. In a jump gate, the combination with a gate, of rockers, links suspending the gate from the rockers, a latch carried by the gate to lock the rockers, gate-opening and closing bell-crank levers having slots, pitmen connected to the gate and having parts loosely received in the slots, and latch-retracting connections between the levers and the latch which are adapted to retract the latch before the pitmen engage the levers in opening the gate.

In testimony whereof I have signed my name to this specification in the presence of two subscribing witnesses.

JOHN WEBSTER JOHNSON.

Witnesses:
GEO. A. STEVENSON,
T. R. McPHERSON.